United States Patent
Haslund

[11] Patent Number: 6,164,195
[45] Date of Patent: Dec. 26, 2000

[54] METHOD AND APPARATUS FOR CONTINUOUS TEMPERING OF CHOCOLATE-LIKE MASS

[75] Inventor: Henning Haslund, Bjæverskov, Denmark

[73] Assignee: Aasted-Mikroverk ApS, Farum, Denmark

[21] Appl. No.: 09/267,640

[22] Filed: Mar. 15, 1999

[30] Foreign Application Priority Data

Mar. 16, 1998 [EP] European Pat. Off. .............. 98104725

[51] Int. Cl.[7] .............................. A23G 1/00; A23G 1/04; A23G 1/18

[52] U.S. Cl. .................................. 99/455; 99/348; 99/470; 99/485; 99/517; 366/144; 366/149; 366/293; 366/304

[58] Field of Search .............................. 99/348, 452–455, 99/458, 459, 460, 464, 466, 470, 517, 483–485, 486, 352–355; 366/144, 147, 149, 304, 315, 293, 312; 425/292, 262; 426/138, 231, 519, 524, 660; 165/94, 95, 109.1; 62/354

[56] References Cited

U.S. PATENT DOCUMENTS

| | | | |
|---|---|---|---|
| 4,859,483 | 8/1989 | Sollich | 426/519 |
| 4,892,033 | 1/1990 | Sollich | 99/455 |
| 5,188,853 | 2/1993 | Sollich | 426/231 |
| 5,514,390 | 5/1996 | Aasted | 426/231 |
| 5,850,782 | 12/1998 | Aasted | 99/455 |
| 5,862,745 | 1/1999 | Aasted | 99/470 |
| 5,899,562 | 5/1999 | Aasted | 366/149 |

FOREIGN PATENT DOCUMENTS

| | | |
|---|---|---|
| 0 289 849 A2 | 11/1988 | European Pat. Off. . |
| 0 339 129 A2 | 11/1989 | European Pat. Off. . |
| 0 472 886 A1 | 3/1992 | European Pat. Off. . |
| 0 685 168 A1 | 12/1995 | European Pat. Off. . |

*Primary Examiner*—Timothy F. Simone
*Attorney, Agent, or Firm*—Finnegan, Henderson, Farabow, Garrett & Dunner, L.L.P.

[57] ABSTRACT

Method and apparatus for continuously tempering a fat-containing, chocolate-like mass. The mass is subjected to a cooling creating crystals in the mass as it passes over crystal creating cooling surfaces, and a final reheating (H). For any raise or drop in the cooling medium temperature or flow, the temperature of the crystal creating cooling surfaces is controlled to be lower than, or equal to a predetermined, maximum temperature value, which creates crystals in the mass.

16 Claims, 3 Drawing Sheets

METHOD AND APPARATUS FOR CONTINUOUS TEMPERING OF CHOCOLATE-LIKE MASS

BACKGROUND OF THE INVENTION

The invention concerns a method of continuously tempering a fat-containing, chocolate-like mass, whereby the mass is subjected to a cooling creating crystals in the mass as it passes over crystal creating cooling surfaces, and a final reheating.

The invention further concerns an apparatus for continuously tempering a fat-containing, chocolate-like mass, comprising a cooling section with crystal creating cooling surfaces and a final reheating section.

For many years, the method has been used extensively for production of a great variety of chocolate-like masses. Before tempering, the chocolate-like mass is warmed up to around 40–60° C. After tempering, the mass typically has a temperature of around 29–33° C., whereafter it is being used for many purposes, such as being filled in moulds, deposited on top of other articles, etc.

The aim of the tempering process is briefly spoken, to create a mass with a portion and a type of crystals, that satisfies, that the chocolate-like mass for sure will solidify to a state, which results in a "high" quality article. To the skilled person, a "high quality" article brings along a glossy surface, long time storage capacity without diffusion of fat content to the surface, crispy break, and of course good taste as well. Experience has gained the knowledge to the skilled person, that such high quality is heavily dependent upon the type of crystals created in the mass during tempering, as well as the actual portion of such crystals, either in relation to the weight of the total mass, or in relation to the fat content of the mass.

Extensive scientific research has since long provided the teaching, that of the several available crystal forms, which may be performed during tempering of a chocolate-like mass, it is the stable β-crystals only, which for sure provides high quality chocolate-like mass.

PRIOR ART

In view of this, methods and apparatuses has been available for many years, by which, the mass is subjected to a cooling, which creates crystals in the mass, as it passes over crystal creating cooling surfaces, whereafter the mass is subjected to reheating.

Such apparatuses may comprise one, two or several cooling sections. The crystal creating surfaces may be obtained within one of such cooling sections, and especially at the end of the cooling section adjacent to the reheating section, or at a cooling section not being the final cooling section to the reheating section.

From EP 0 289 849 A1 is known an apparatus of the above mentioned art. The apparatus comprise one single cooling section as well as a reheating section. The crystal creating surfaces are obtained at the end of the cooling section adjacent to the reheating section. The cooling water is circulated continuously, and the temperature of the cooling water is regulated in response to the temperature of the mass being measured by a sensor at the end of the cooling section. It is well known that by such apparatus type, the temperature of the crystal creating cooling surfaces fluctuate extensively. Tests has disclosed, that the temperature of the crystal creating surfaces fluctuate over 10° C. when the temperature or flow of the mass changes. Thereby the tempering state of the ready tempered chocolate could not be controlled to a constant level. It was disclosed, that when the surface temperature deviates from an average temperature around 18–19° C. the portion of crystals deviates from being constant as well. The result is a mass which sometimes is "overtempered" and sometimes is "undertempered" depending on how great variations in temperature or flow of the mass which actually were experienced.

Among the latest teachings within the field are such apparatuses as those known from EP 0 472 886 A1 and EP 0 685 168 A1. By these known apparatuses the reheating section is arranged on top of two, three or several cooling sections in a column. Each of the sections comprise at least one mass chamber through which the mass flows, as well as at least one medium chamber through which the cooling medium flows. The mass is subjected to stirring means arranged in the mass chambers.

These apparatuses comprise a primary cooling section, and a secondary cooling section in which crystals are created. The theory is, that the mass is to be cooled down in the first section to a temperature "close" to the temperature, at which stable crystals performs in the mass. It is well known, that for each type of chocolate-like mass, whatever its composition may be, such temperature may be determined by simple tests. For most types of chocolate-like mass, such temperatures are between 26° C. and 30° C. Thereafter, the mass is caused to pass through the secondary cooling section, in which the crystals are created. By observing, that the temperature of the cooling medium is sufficiently low in that section, the heat created by the crystal formation is removed entirely. The mass temperature could be constant or lowered slightly further in the secondary section. Thereby, the skilled person was sure, that crystals were performed in that secondary section.

By these teachings various types of cooling medium circuits are suggested for the secondary, crystal creating section. EP 0 685 168 A1 disclose that the cooling medium flow may be controlled in response to measured values of the mass temperature. Thereby the extension of the crystal creating surfaces may be adapted to the instantaneous cooling requirement.

EP 0 472 886 A1 disclose, that the temperature of the cooling water in the secondary section may be controlled in response to values of the water temperature measured by a sensor arranged in the water conduit at the inlet to the cooling chamber comprising the crystal creating surfaces.

EP 0 472 886 A1 further disclose, that by such control, the temperature of the crystal creating surfaces of the secondary section is to be kept constant within fractions of one degree Celsius, preferably within one degree Celsius. The teaching disclose, that this should be obtained by keeping the cooling water temperature at a constant value at the inlet to the cooling chamber.

However, practice as well as scientific tests of the above apparatus type, as well as of other apparatus types has disclosed, that when variations in mass temperature or flow occurs, the temperature of the crystal creating surfaces change as well. If the temperature or the flow of mass rise, then after some time, a rise in the cooling water temperature is registered, and to compensate that rise, the water temperature is automatically lowered by the circuit. Decisive is, that the inventor discovered, that by the prior art the cooling surface temperature could not be kept constant independent of variations in flow or temperature of the mass as presumed.

If, on the other hand, the temperature or the flow of the mass suddenly lowers, the temperature of the crystal creating surfaces will fall. Again, after some time, a fall in the cooling water temperature is registered, and to compensate, the circuit automatically regulates the water to a higher temperature.

The unavoidable effect measured by the tests was, that the temperature of the crystal creating surfaces of the secondary cooling section fluctuated extensively within as much as 2.5° C. for the apparatus type disclosed in EP 0 472 886 A1, when the temperature or flow of the mass through the apparatus changed. It was surprisingly realised, that this was the cause to a varying amount of crystals in the ready tempered mass.

Though minor temperature fluctuations were experienced by the apparatus type of EP 0 685 168 A1 it was not possible with this apparatus type either to obtain a desired, essentially constant portion of crystals in the tempered mass when mass temperature or flow changes. By constant portion of crystals is meant, that the amount of crystals constitutes a constant percentage of the total amount of the tempered mass, alternatively of the fat content of the mass.

The conclusion was, that by none of the above-referred teachings a constant temperature of the crystal creating surfaces could be obtained when the temperature or the flow of the mass changes. When the temperature of the surfaces fluctuates upwards, the effect is, that the crystal creating surfaces shrinks. Thereby the portion of crystals in the mass shrinks as well, and the mass becomes "undertempered". When the temperature of the surfaces fluctuates downwards the unintended effect is, that the crystal creating surfaces are extended. Thereby the portion of crystals in the mass is raised and the mass becomes "overtempered". The end result is, that the portion of crystals in the mass deviates from being constant when temperature or flow of the mass changes. Therefore, a constant portion of crystals could not be obtained by the prior teachings.

The skilled person always tries to reach a tempered mass with a portion of stable crystals, which is kept as constant as possible during the total production. When the exact, and therefore desired amount of crystals for the specific article and chocolate type has been established empirically, the aim is to reach that desired amount as closely as possible for every article produced. Only then, the manufacturer is sure, that the good qualities such as a glossy surface, long time storage capacity without migration of fat content to the surface, crispy break, and of course good taste is preserved for every article produced.

As it is the actual control performed for the cooling sections during tempering of the mass that determines the achieved portion of crystals, it is of outmost importance to establish such control as exact and reliable as possible with a view of obtaining a constant portion of crystals in the mass.

Furthermore, the EP 0 289 849 A1 teaches, that a "high" portion of stable crystals in the tempered mass is desirable. The teaching states, that 4–5% stable crystals should be reached in the mass by tempering. The desire for such a "high" content of stable crystals actually verifies a long time impression within the field of tempering.

However, for the latest few years the desire for a "high" content of stable crystals has suddenly been left. The persons skilled within the field have recognised, that scientific research today guides in the opposite direction, and that is for a very "low" portion of stable crystals in the mass. Such "low" portion is around 0.2–2.0% of the fat content of the mass. It is evident, that when aiming at such "low" portions of crystals to be kept constant, it is even more important to minimise the variations in crystal amount in relation to the desired "low" portion, as every actual variation gives a much greater percentage deviation from the desired portion than compared to, when a "high" portion of crystals is aimed at.

Therefore, the general change within the field towards such comparably "low" portions of stable crystals makes it even more important to achieve an exact control of the cooling. Only with an exact and reliable control of the cooling, an essentially constant portion of crystals in the mass may be achieved, especially whatever the variations in the mass temperature or flow may be.

SUMMARY OF THE INVENTION

According to the inventive method for any raise or drop in the cooling medium temperature or flow, the temperature of the crystal creating cooling surfaces is controlled to be lower than, or equal to a predetermined, maximum temperature value, which creates crystals in the mass.

The inventive apparatus further comprises means, which for any raise or drop in the cooling medium temperature or flow are adapted to control the cooling performed by the cooling medium, so that the temperature of the crystal creating surfaces is lower than, or equal to a predetermined, maximum value.

Hereby is surprisingly obtained that the portion of crystals in the mass is kept substantially constant.

By the invention, variations in temperature or flow of the mass could not cause the temperature of the crystal creating surfaces to rise above the predetermined, maximum value. The temperature gradient between the temperature of the mass and of the cooling medium always cross the cooling surface at a constant temperature.

Furthermore, it is secured, that the temperature of the crystal creating surfaces are always kept sufficiently low for performing crystals in the mass, what ever variations may occur in the temperature or flow of the mass.

The creation of crystals in the mass is thereby controlled to a much more constant portion of the total amount of mass than obtainable by the prior art. By the invention, especially an "undertempered" mass with a varying portion of crystals is avoided as the surface temperature never rise to a value by which crystals are not obtainable. Continuos production of "high quality" articles from the tempered mass is thereby obtained whatever variations may occur in the mass temperature or flow.

During the initial adjustment of the tempering process according to the invention, the temperature of the cooling medium performing the crystal creating cooling, is adjusted to a level where it provides a temperature of the cooling surfaces that satisfies creation of crystals in the mass. This could advantageously be obtained by lowering the cooling medium temperature just sufficiently for the crystals to perform at the surfaces. By the inventive control, where the temperature of the crystal creating surfaces is controlled to be kept lower than, or equal to a predetermined, maximum temperature value, which creates crystals in the mass, and an uninterrupted creation of crystals is secured.

Important to notice is, that it was surprisingly found by the inventor, that when approaching the cooling medium temperature by which crystals performs in the mass in question, it was sufficient to lower the temperature slightly further down for the desired stable crystals to perform in the mass. The sufficient further lowering of the cooling medium temperature in that section could be so low as fractions or tenths of one degree Celsius for the crystals to perform, especially was a further lowering of 0.5–1.0° C. sufficient for all types of masses tested.

Further according to the invention, the temperature of the crystal creating cooling surfaces could be controlled to be higher than a predetermined, minimum temperature value. Thereby, excessive low temperatures of the cooling surfaces are avoided when variations in mass temperature or flow occurs. A so-called "overtempered" mass with a to high portion of crystals is thereby excluded.

The temperature of the crystal creating cooling surfaces may advantageously be controlled to be lower than, or equal to 22° C. or higher than, or equal to 10° C. Even more preferably the temperature of the crystal creating cooling surfaces is controlled to be lower than, or equal to 18.5° C. or higher than, or equal to 13.5° C.

It was surprisingly found, that for most types of masses, it was sufficient to target the temperature of the cooling creating surfaces to around 18.5° C. for the crystals to perform in the mass.

The invention has proven to be especially efficient when the temperature of the cooling medium performing the cooling of the crystal creating cooling surfaces is controlled in response to the temperature of the crystal creating cooling surfaces. Thereby, the temperature of the crystal creating surfaces may be kept constant. Hereby is meant, that the temperature fluctuations is kept under as low fractions as tenths of one degree celsius, preferably under 1/20 degree celsius.

An even more temperature constant control is obtained, when the flow of the cooling medium performing the cooling of the crystal creating cooling surfaces is controlled in response to the temperature of the crystal creating cooling surfaces.

During initial adjustment of the tempering process to the chocolate-like mass in question, the predetermined, maximum temperature value, which creates crystals in the mass, may advantageously be obtained when the temperature of the crystal creating cooling surfaces is set to a temperature, at which no crystals are created in the mass, whereafter the temperature is lowered until crystals performs in the mass in question.

The cooling medium could be re-circulated. Thereby is furthermore obtained a more efficient heat exchange in the crystal creating section, as the difference between the inlet and outlet temperatures of the cooling medium is smaller than without a re-circulation.

The flow of the cooling medium performing the crystal creating cooling is controlled in response to the temperature of the mass.

A superior control of the secondary and the primary cooling is achieved, when a mass temperature sensor is arranged in the mass, and is connected to control means adapted to control the flow of the cooling medium performing the crystal creating cooling in response to the temperature of the mass.

The temperature of the cooling medium performing the crystal creating cooling could be controlled to a constant level in response to the cooling medium temperature being measured in the cooling chamber adjacent to the crystal creating surfaces.

Advantageously, the mass is subjected to a preceding, primary cooling in front of the secondary, crystal creating cooling, by which primary cooling the mass is cooled down close to a temperature, at which crystals perform in the mass.

The inventive apparatus may comprise a cooling medium temperature sensor, and be adapted to control, that the temperature of the cooling medium for the crystal creating surfaces is lower than a predetermined, maximum value.

The inventive apparatus may also be adapted to control, that the temperature of the cooling medium for the crystal creating surfaces is higher than a predetermined, minimum value.

Advantageously, a temperature sensor is arranged at the crystal creating surface.

The apparatus may further comprise an electronic regulator connected with the temperature sensor arranged at the crystal creating surface, and which electronic regulator is adapted to control the temperature of the cooling medium in response to the temperature of the crystal creating surface. Thereby is obtained especially accurate control.

The apparatus may further comprise an electronic regulator connected with the temperature sensor arranged at the crystal creating surface, and which electronic regulator is adapted to control the flow of the cooling medium in response to the temperature of the crystal creating surface.

The inventive apparatus may also comprise a mass temperature sensor, which is arranged in the mass and is connected to control means, such as valve or pump means adapted to control the flow of cooling medium performing the cooling of the crystal creating surfaces.

An especially efficient embodiment provides, that a cooling medium temperature sensor is arranged in the cooling medium for the crystal creating cooling section, and is connected to other control means, that controls the temperature of the cooling medium to a constant level.

The cooling medium temperature sensor may be arranged in the cooling chamber adjacent to the crystal creating surfaces.

Further, the apparatus could comprise a further subsequent, third cooling section through which the cooling medium conduit leads the cooling medium before it enters the inlet of the primary cooling section. Thereby a more stable heat exchanger is provided by which the cooling medium temperatures are surprisingly more stable than without that third section. This applies especially when a mass temperature sensor is arranged in that third section and constitutes part of control means for the regulation of the secondary, crystal creating cooling.

BRIEF DESCRIPTION OF THE INVENTION

The invention will be explained more fully below with reference to preferred embodiments and the drawings in which FIG. 1 shows schematically a vertical section of the tempering column of a tempering apparatus, FIG. 2 shows schematically the tempering column and the associated circuit of a first embodiment of a tempering apparatus, FIG. 3 shows schematically an enlarged wall-section separating a cooling chamber and a mass chamber of the first embodiment of the tempering apparatus shown in FIG. 2, FIG. 4 shows schematically the tempering column and the associated circuit of a second embodiment of a tempering apparatus, and FIG. 5 shows schematically an enlarged wall-section separating a cooling chamber and a mass chamber of the second embodiment of the tempering apparatus shown in FIG. 4.

DETAILED DESCRIPTION OF THE INVENTION

Figure 1:
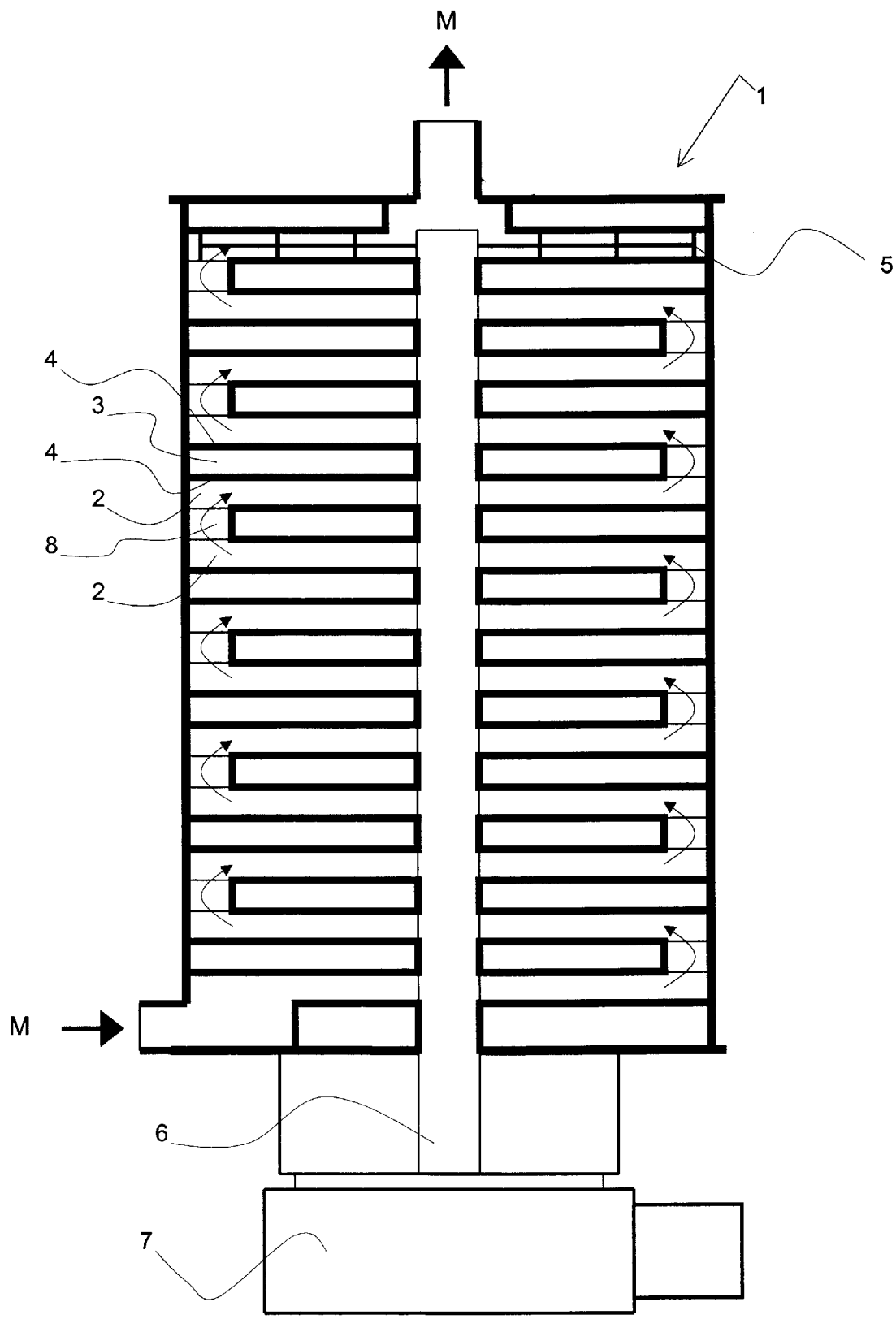

The tempering column 1 shown in FIG. 1 has a circular vertical section, and comprises a plurality of alternating mass chambers 2 and intermediary medium chambers 3 for cooling or heating medium, which chambers 2, 3 are separated by intermediary, disk-shaped walls 4. In each mass chamber 2 are preferably arranged a stirring means 5, whereof only one is shown for clarity, and which stirring means 5 are rotated by means of a central, vertical shaft 6 driven by a motor 7.

By means of for instance a pump, which are not shown, the mass is forced to flow through the tempering column 1 with a general vertical direction M, which by the disclosed embodiment is from the bottom to the top. In each mass chamber 2, the mass is subjected to a stirring means 5, as well as to cooling or a heating effected to the mass by the cooling or heating medium in question flowing through the adjacent chamber 3. The mass chambers are interconnected by openings 8, which preferable are arranged at the periphery of the column 1 or at the centre close to the vertical shaft 6.

Such a tempering column has been known for more than half a century, and is today the most widely used heat exchange means for tempering of chocolate-like mass. It is furthermore well-known, that the best performance of such a tempering column is achieved, when the cooling or heating medium flow continuously through the chambers and when the stirring means 5 exerts shearing forces as well as a force-full stirring to the mass.

Though the inventive method and apparatus is explained in relation to the above mentioned type of tempering column only, the invention may apply for every other type of tempering system. Other systems may comprise a tempering column, which is horizontal or inclined or even partitioned in several sections, or the column may be substituted by vessels or tubes.

Figure 2:
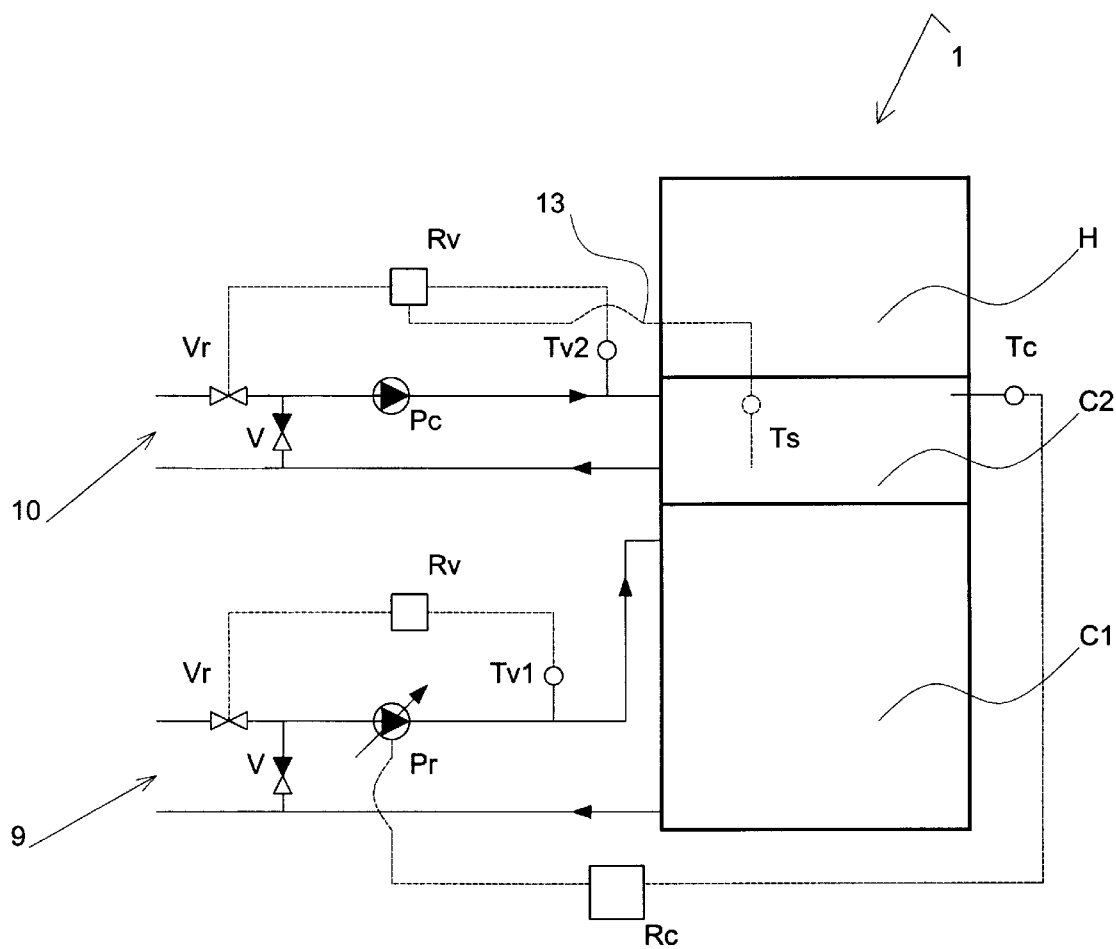
Figure 3:
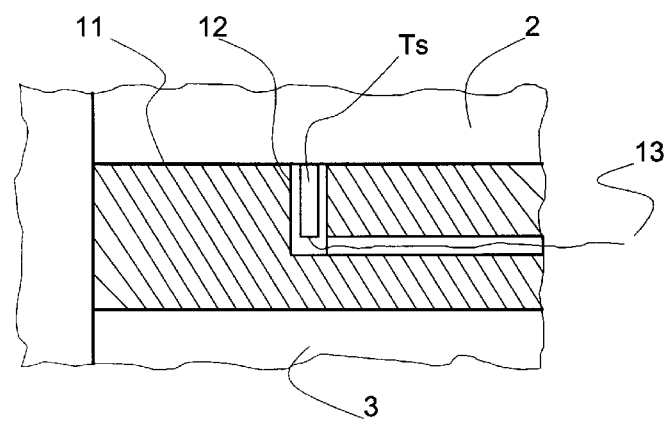
Figure 4:
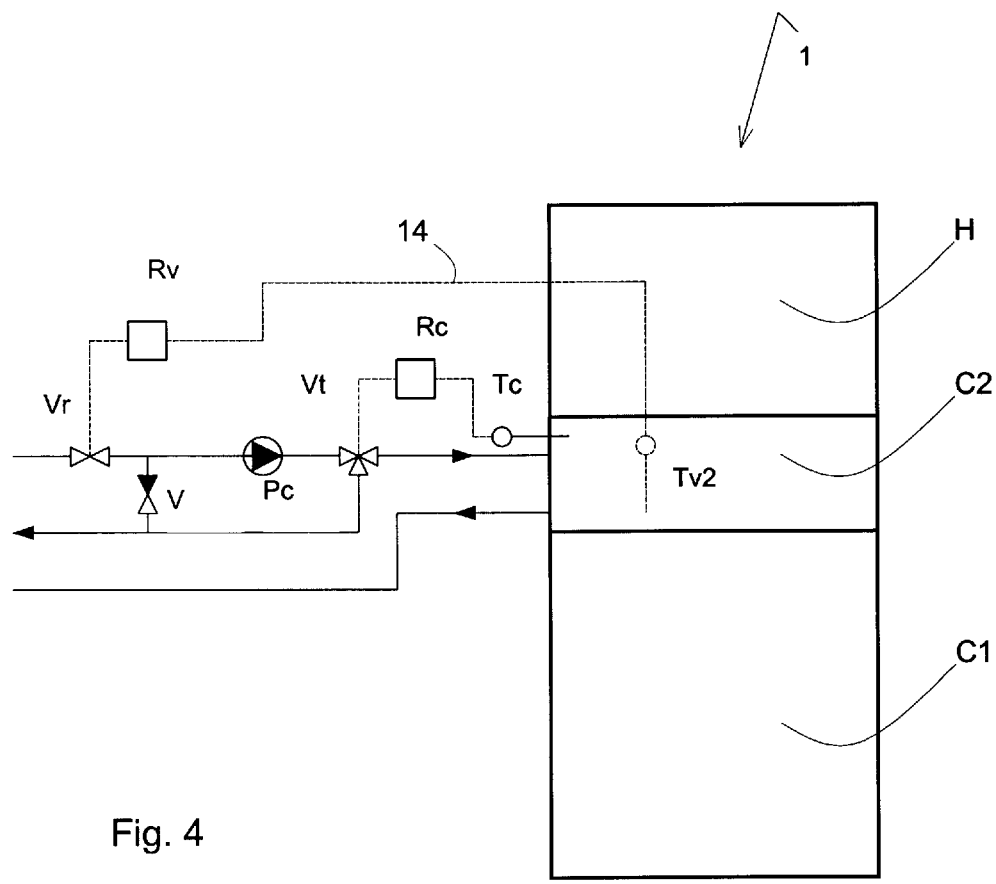

The first and second embodiments of the inventive apparatuses shown in FIG. 2 and 4 comprise a vertical tempering column 1 of the type shown in FIG. 1. For clarity, the tempering column 1 is disclosed schematically in FIG. 2 and 4 without details, as only the actual extension of the cooling and heating sections are disclosed. Such extensions are simply established by having the cooling or heating medium for the section in question flowing through a predetermined and interconnected number of chambers. The extension of the section in question will thereby correspond to the number of chambers through which the medium flow with the specific temperature chosen for that section.

The apparatus for continuous tempering of a fat-containing, chocolate-like mass shown in FIG. 2 comprises a primary cooling section C1, a subsequent secondary cooling section C2 with crystal creating cooling surfaces, and a final re-heating section H. The circuit, which controls the admission of the heating medium to the reheating section H, is left out for clarity, as such circuits are well-known and could be established in different ways as long as they establish a controlled re-heating of the mass, preferably around 1–3° C. The admission of heating medium could by such known circuits for example be controlled with a constant temperature of the medium as well as with re-circulation of heating medium through the medium chambers.

By the first embodiment of the apparatus shown in FIG. 2 each cooling section C1 and C2 comprise a separate circuit 9 and 10, respectively for the circulation of cooling medium through the medium chambers.

The cooling circuit 10 of the secondary cooling section C2 comprises a pump Pc, which keeps the cooling medium running continuously through the chambers of that section. A temperature sensor Tv2 measures the water temperature and is connected to a further regulator Rv, which by a connection to a further regulation valve Vr administer the supply of cold water to the circuit 10, so that the temperature of the cooling medium supplied to the chambers of the secondary section C2 is kept at an essentially constant level.

The cooling circuit 9 of the primary cooling section C1 comprises a pump Pr with variable flow, which is controlled in a well-known manner by an electronic regulator Rc, which receives values for the temperature of the mass measured by means of a temperature sensor Tc. By regulating the flow of the pump Pr in response to the mass temperature, the cooling amount is lowered when the mass temperature lowers and vise versa.

The circuit 9 of the primary cooling section C1 furthermore comprises a temperature sensor Tv1, which measures the temperature of the cooling medium supplied to the primary cooling section C1. The temperature sensor Tv1 is connected to an electronic regulator Rv of a well-known type, which by a connection to the regulation valve Vr, administers the supply of cold water, so that the temperature of the cooling medium supplied to the chambers is kept essentially constant in this section as well. One-way valves V determines the flow direction at several positions of the circuits 9 and 10.

The apparatus shown in FIG. 2 comprises a further temperature sensor Ts, which is arranged in a depression or bore 12 in the crystal creating cooling surface 11. A wire 13 connects the sensor 11 the regulator Rv of the cooling circuit 10 of the secondary cooling section C2. The regulator receives continuously values for the temperature of the crystal creating surfaces and lowers the admission of external water through the valve Vr if the surface temperature approaches the predetermined, maximum temperature value, which creates crystals in the mass. The predetermined maximum temperature value is adjusted at the regulator Rv and could be as high as 22° C., but is preferably set to 18.5° C. A predetermined, minimum temperature of the crystal creating surfaces is also adjusted by the regulator, and could be set as low as 10° C.

For any variations in mass temperature or flow is thereby secured, that the temperature of the crystal creating surfaces is kept lower than or equal to a predetermined, maximum temperature, which creates crystals in the mass. The temperature of the crystal creating cooling surfaces is thereby kept constant as well as sufficiently low to continuously create a constant portion of crystals in the mass. The maximum temperature is set or adjusted at the electronic regulator.

It should be observed, that by the embodiment shown in FIG. 2, the temperature sensor Tv2 arranged in the conduit supplying cooling water to the inlet of the cooling chamber could be omitted. Thereby the regulator Rv is adapted to control the temperature or the flow of the cooling water in response to the temperature of the crystal creating surface 11, by being connected to the temperature sensor Ts only. The temperature sensor could also be arranged within the cooling chamber, and especially close to, or in the wall constituting the crystal creating surface 11, which wall separates the cooling medium chamber 2 and the adjacent mass chamber 2, referring to FIGS. 4 and 5.

By the second embodiment disclosed in FIG. 4 the circuit of the primary cooling section C1 is left out for clarity as it could be arranged in any known manner.

Figure 5:
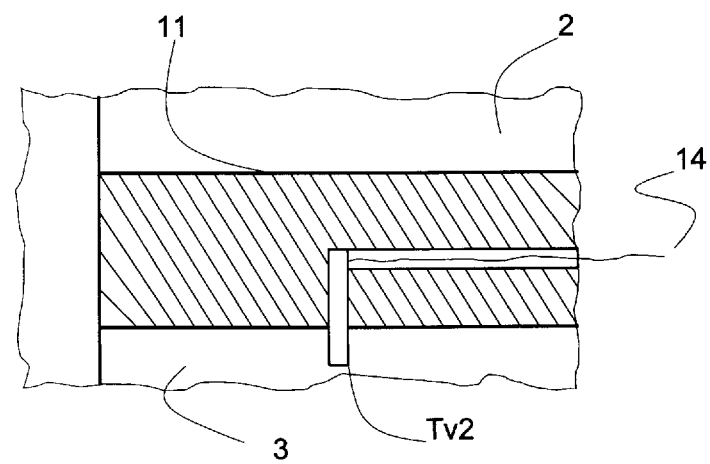

As disclosed in FIG. 4 a temperature sensor Tv2 measures the temperature of the cooling medium in the cooling chamber of the crystal creating surfaces 11 at FIG. 5. The sensor Tv2 is arranged in the cooling chamber at the crystal creating surfaces 11, and is connected to a regulator Rv, which controls the amount of water administered by the valve Vr, so that the temperature of the cooling medium delivered to the pump Pc is kept constant at the chamber. A mass temperature sensor Tc is further arranged in the mass, preferably at the end of the final cooling section, and is connected to an electronic regulator Rc adapted to control the flow of the cooling medium through the secondary cooling section C2 in response to the temperature of the mass.

For obtaining this, the regulator Rc is connected to a flow regulation means, such as the depicted three-way valve Vt or other known devices for obtaining such flow control. By this control the amount of cooling medium delivered to the secondary section is always adapted to the instantaneous requirement what ever the temperature or the flow of the mass may be. It is well recognised, that the amount of stable crystals created in the mass in the secondary section is always kept at a constant portion by this means of control.

During initial adjustment of the tempering process to the chocolate-like mass in question, the temperature of the cooling medium delivered to the secondary section C2 is lowered until crystals performs in the mass. It was surprisingly found, that when approaching the temperature for creation of crystals, it was sufficient to lower the temperature of the cooling medium administered to the secondary cooling section C2 only tenths of one degree Celsius further for the crystals to perform very suddenly and in a satisfactory amount to reach a "well-tempered" mass. Especially seemed a lowering of 0.5–1.0 degrees Celsius to be sufficient for all types of chocolate-like mass tested. During such initial test the regulator simply obtains the predetermined, maximum temperature value of the crystal creating surfaces, when being manipulated accordingly by the operator, who is satisfied by the tempering curves or DSC measurements being performed continuously with the tempered mass. The maximum temperature could also be set or adjusted by simply feeding or keying the maximum temperature at the electronic regulator. A minimum value, which the surface temperature should be equal to or higher than could also be set or adjusted at the electronic regulator.

Furthermore is a possible misoperation or a misadjustment of the secondary cooling section caused by the personnel avoided, as no further adjustment of the secondary section is required.

By the apparatus disclosed in FIGS. 2 and 4 a further subsequent, third cooling section could be arranged as well. Surprisingly, a more "stable" heat exchanger is achieved, than without that third section C3. Hereby is meant, that the measured cooling medium temperatures could be kept more stable than without that third section. This applies especially when the mass temperature sensor Tc is arranged in one of the mass chambers of the third section C3.

It should be observed, that the arrangement of the temperature sensors Ts and Tv2 are optional. Both sensors Ts and Tv2 could be arranged at the cooling section simoultaneously or one at a time by the preferred choice.

By a row of tests several known types of apparatuses was compared to the inventive embodiment shown in FIG. 4 of this application.

By these tests, liquid dark chocolate of a well-known type was warmed to a constant temperature of 48° C. when supplied to the apparatus in question. The supply of the mass was changed between 970 kilos per hour and 550 kilos per hour. During the whole test period, the temperatures of the cooling water entering or leaving the respective cooling section was measured continuously. Furthermore tempering curves disclosing the achieved tempering state of the mass was evaluated.

Astonishingly, it was discovered, that by one type of such known apparatus described in EP 0 472 886 A1, the surface temperatures of the secondary cooling section fluctuated within an interval of 2.5° C., and a constant portion of crystals in the tempered mass could not be reached. This was caused by an unavoidable, periodically "overtempering". In contradiction, the temperatures of the primary cooling section fluctuated within an interval of ⅒ C. only by the inventive apparatus shown in FIG. 4 with the addition of the mentioned third cooling section. An essentially constant portion of crystals within few percents was surprisingly observed, and the tempering curves showed no "overtempering".

What is claimed is:

1. Apparatus for continuously tempering a fat-containing, chocolate mass, comprising a cooling section with crystal creating cooling surfaces and a final reheating section, and means for controlling the cooling performed by a cooling medium for the crystal creating cooling surfaces for any raise or drop in the cooling medium temperature or of the flow thereof, so that the temperature of the crystal creating cooling surfaces is lower than, or equal to a predetermined, maximum temperature value which creates crystals in the mass.

2. Apparatus according to claim 1, which means also controls the cooling performed by the cooling medium, so that the temperature of the crystal creating cooling surfaces is higher than a predetermined, minimum temperature value.

3. Apparatus according to claim 1, which means comprises a cooling medium temperature sensor that is adapted to control the temperature of the cooling medium so that the temperature of the crystal creating cooling surfaces is lower than a predetermined, maximum temperature value.

4. Apparatus according to claim 2, which means comprises a cooling medium temperature sensor that is adapted to control the temperature of the cooling medium so that the temperature of the crystal creating cooling surfaces is higher than a predetermined, minimum temperature value.

5. Apparatus according to claim 1, which means comprises a temperature sensor arranged at the crystal creating cooling surfaces.

6. Apparatus according to claim 5, which means further comprises an electronic regulator connected with the temperature sensor arranged at the crystal creating cooling surfaces and adapted to control the temperature of the cooling medium in response to the temperature of the crystal creating cooling surfaces.

7. Apparatus according to claim 5, which means further comprises an electronic regulator connected with the temperature sensor arranged at the crystal creating cooling surfaces, and adapted to control the flow of the cooling medium in response to the temperature of the crystal creating cooling surfaces.

8. Apparatus according to claim 1, further comprising a mass temperature sensor arranged in the mass and connected to control means adapted to control the flow of cooling medium performing the cooling of the crystal creating cooling surfaces.

9. Apparatus according to claim 1, further comprising a cooling medium temperature sensor arranged in cooling medium for the crystal creating cooling section, and which is connected to other control means that control the temperature of the cooling medium at a constant level.

10. Apparatus according to claim 3, wherein said cooling medium temperature sensor is arranged in a cooling chamber adjacent to the crystal creating cooling surfaces.

11. Apparatus according to claim 1, including pump means providing a continuous flow of cooling medium through the cooling section.

12. Apparatus according to claim 1, including a preceding, primary cooling section in front of said cooling section.

13. Apparatus according to claim 1, including a subsequent cooling section arranged after said cooling section.

14. Apparatus according to claim 12, whereby the primary cooling section, said cooling section and the reheating section are arranged on top of each other in a column, each of which cooling sections comprises at least one mass chamber through which the mass flows, as well as at least one medium chamber through which the cooling medium flows.

15. Apparatus according to claim 14, whereby the mass is subjected to stirring by stirring means arranged in the mass chambers.

16. Apparatus according to claim 4, wherein said cooling medium temperature sensor is arranged in a cooling chamber adjacent to the crystal creating cooling surfaces.

* * * * *